United States Patent [19]

Williams et al.

[11] 4,047,992
[45] Sept. 13, 1977

[54] TURN-ON METHOD AND APPARATUS FOR ULTRASONIC OPERATIONS

[75] Inventors: David Alan Williams, Pittsford; Karl Sperber, Hilton; Calvin Owen Stoutz, Pittsford, all of N.Y.

[73] Assignee: Eastman Kodak Company, Rochester, N.Y.

[21] Appl. No.: 663,024

[22] Filed: Mar. 2, 1976

[51] Int. Cl.² .............................................. B32B 5/18
[52] U.S. Cl. .................................. 156/73.1; 156/351; 156/366; 156/580.1; 228/1 A; 264/23; 310/317
[58] Field of Search .......................... 310/8.1, 8.2, 8.3; 318/116, 118; 156/73.1, 580.1, 351, 366, 580.2; 269/23

[56] References Cited

U.S. PATENT DOCUMENTS

| | | | |
|---|---|---|---|
| 3,573,781 | 4/1971 | Shoh | 228/1 |
| 3,585,096 | 6/1971 | Uhimchuck et al. | 228/1 |
| 3,791,569 | 2/1974 | Mims | 228/1 |

*Primary Examiner*—Edward G. Whitby
*Attorney, Agent, or Firm*—J. A. Matthews

[57] ABSTRACT

Ultrasonic method and apparatus having improved turn-on. Low level power is furnished to an unloaded transducer to start it running at a desired frequency. High level power is then furnished the transducer for performing the ultrasonic operation while loaded. The high level power is stopped and the low level power is maintained, reduced or stopped before the load is removed.

7 Claims, 3 Drawing Figures

TURN-ON METHOD AND APPARATUS FOR ULTRASONIC OPERATIONS

BACKGROUND OF THE INVENTION

1. Field of the Invention

The present invention relates to an ultrasonic apparatus and method which are especially adapted for material sealing or splicing as by joining together parts of relatively large size.

2. The Prior Art

The splicing or sealing of parts or sheets of material such as photographic film, resin coated photographic paper, and other types of thermoplastic resin films, such as, wrapping materials, has been practiced for some time. In such a procedure the sheets to be joined are positioned with their edges in overlapping relationship and an energized ultrasonic transducer horn is moved toward a cooperating anvil to seal the sheets or relative movement is effected between the horn and the sheets. The sealing energy is proportional to the product of the input electrical power supplied the transducer horn, the loading force or pressure applied to the transducer, and the frequency of vibration of the transducer horn.

Other ultrasonic operations are a field bonding of plastic parts as in U.S. Pat. No. 3,224,916; riveting of plastic parts as in U.S. Pat. No. 3,367,809; and sinking metal parts into plastic as in U.S. Pat. No. 3,184,353. Operations can be conducted with relative movement between the work and the ultrasonic horn as in U.S. Pat. No. 3,585,096, or without such motion.

In ultrasonic operations, and especially ultrasonic welding of plastic parts, it is important to hold the parameters of sealing time, input electrical power, and loading force close to optimum values to achieve consistently good results. Most commercially available ultrasonic equipment provide for adjustment of these parameters and further provide automatic frequency control (AFC) and/or automatic amplitude control. Such automatic controls are intended to maintain an "in tune" condition in spite of variations in the acoustic load during the sealing cycle and to prevent "run away" damage to the equipment in the absence of a load.

In high power applications of ultrasonics, it is essential and basic that (1) the source and load impedances be properly matched, and the (2) the system operate at the natural resonant frequency of the transducer and horn combination. In applications requiring intermittent use of ultrasonic power, such as welding of plastic assemblies, it is further important that power turn-on characteristics be repeatable and as rapid as possible so that each seal is permitted to receive the full amount of applied energy. Also, during the period of each weld the changing character of the load causes the reflected load impedance and mechanical resonant frequency to vary. It is often desirable to limit the power to the transducer when it is not loaded to prevent excessively high amplitude vibrations and heat build up, either of which could cause permanent damage to the transducer/horn assembly.

Some of these factors have been recognized for some time and numerous patents have been issued. For example, U.S. Pat. No. 2,917,691, provides means for maintaining operation at the transducer resonant frequency for purpose of maximum power transfer under conditions of varying load; however, no means are provided to maintain a prescribed power level or to limit power to a safe level with no load present.

U.S. Pat. No. 3,447,051, Atwood et al., provides automatic frequency control (AFC) and also senses transducer current, the amplifier of which is related to the amplitude of transducer vibration. The amplitude of transducer current is held constant by means of feedback and a variable gain circuit. This automatic amplitude control constitutes automatic power control (APC). When the intended operation is completed, a manually operated switch is provided which, when operated, reduces the transducer current to a safe value. The circuits are not shut down completely, thus minimizing any delay before operation is resumed. A problem is some times encountered with these circuits when it is desired to cool the sealed material before reducing the loading force on the transducer. Since there is no provision for terminating the power supply to the transducer, the transducer is always vibrating. This vibration can have an adverse effect on the quality of the seal and can also increase the amount of time required to cool the sealed material.

In U.S. Pat. No. 3,443,130, motional current supplied to a transducer is limited to a substantially constant value, which also protects the transducer in the absence of its intended load. A rather large impedance, preferably reactive, in a series circuit with the transducer is used with operation of the transducer at a frequency different from its natural mechanical resonant frequency. This system fails to make most efficient use of the system components. Further, these methods are not suitable for high power operation with a large horn. If operation can be achieved, the power obtainable is less than the rated value for the equipment. Also, turn-on is erratic in that the system does not always repeat the same operating frequency and power level.

In summary, when sealing parts of relatively large size such as film cassettes, and where the lateral dimensions of the ultrasonic horn of the transducer approach or even exceed an acoustic half wavelength, the increased power requirements make it desirable to maintain tuning to develop maximum power. It is also difficult to design a horn free of spurious resonances near the desired operation frequency. The horn can be started vibrating on the correct frequency when unloaded; therefore, it is common practice to apply power before the horn contacts the workpiece by sensing the proximity of the horn to the workpiece, or by sensing the applied force of the horn against the work before full force is developed, and then switching on power. In either case, full power is switched on immediately. Even when these techniques are used, occasional poor seals are produced.

Thus, in applying power to a transducer, particularly where a large horn is used, it is difficult to assure that the apparatus will operate at the desired frequency since such large horns often have harmonics near the desired operating frequency. If the desired frequency is not achieved, the resulting operations may be faulty, or at least of an uncertain quality level. While initiating operation at the desired frequency is more certain when the transducer horn assembly is started under little or no load, this conflicts with the fact that the transducer horn assembly can be damaged if operated under no-load conditions. Also, bringing an already vibrating horn into contact with a workpiece can mar the surface at the point of contact, resulting in cosmetic defects in the product. The present invention resolves the conflict among the foregoing factors by initially applying a low level of power to the transducer horn assembly before it is placed under load thereby more readily initiating operation at the desired frequency. This power level is at a sufficiently low level that the risk of damaging the assembly and/or the workpiece is avoided. As the transducer horn assembly is loaded by contact with the workpiece, the power is increased to a level sufficient to provide the desired operations on the workpiece with the requisite quality.

SUMMARY OF THE INVENTION

The problems of the prior art discussed above have been solved by the present invention which provides an improved method and apparatus for improving the overall reliability and quality of sealing or other operations by an ultrasonic apparatus.

In accordance with the present invention, means and apparatus are provided for obtaining, in an ultrasonic sealing device, maximum usable power along with reliable, rapid turn-on. The invention provides an improved method for operating and controlling a conventional ultrasonic device for sealing or welding plastic assemblies or other intermittent, high power applications. According to the invention, a direct current power supply is provided to furnish at least one of two preselected power levels to an ultrasonic inverter which is part of a conventional transducer device. The first or low power level starts the transducer horn vibrating at or near the desired operating frequency. The second or high power level is used for actual sealing. A control circuit is provided to determine which of the power levels is supplied to the inverter.

In accordance with one embodiment of the present invention, the first power level is provided when the initial motion of the transducer horn towards the workpiece is sensed. The second power level is provided either just before or just after the transducer horn contacts the workpiece. In either case, the second power level is provided the inverter before full load of the transducer horn on to the workpiece. Both power levels are maintained for a period of time determined by a timer within the control circuit. The load is maintained on the transducer horn after the supply of high level power to the inverter has been stopped and the low level power is maintained, reduced or stopped to allow the sealed material to cool. During the sealing operation, automatic frequency control (AFC) and automatic power control (APC) circuits ensure proper operation of the ultrasonic sealing device.

By reducing the lower power we mean reducing it to zero or sufficiently close to zero that the horn has essentially no further heating effect on the workpiece.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

Because apparatus for the ultrasonic sealing of sheets of material, film cassettes, etc., are well known, the present description will be directed in particular to elements forming part of, or cooperating more directly with apparatus in accordance with the present invention. It is to be understood that elements not specifically shown or described may take various forms well known to those skilled in the art.

Figure 1:
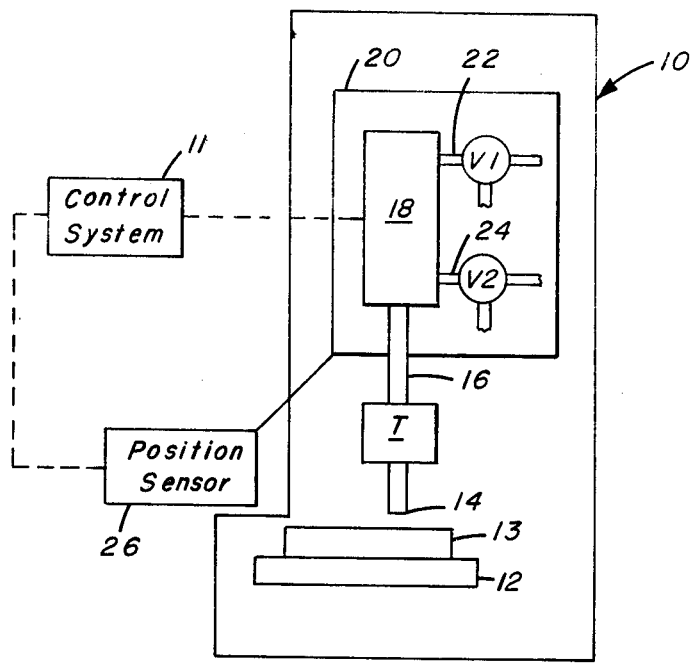
FIG. 1 is a schematic side elevational view showing ultrasonic sealing apparatus in accordance with one embodiment of the invention.

Referring to FIG. 1, there is shown, in highly diagrammatic form, an ultrasonic sealing device incorporating the present invention. The device is comprised of a known sealing apparatus, generally designated 10, which is controlled by a control system 11, modified in accordance with the present invention. The apparatus 10 has an anvil 12 in the form of a flat metal table or nest, and a cooperating ultrasonic transducer device T having a horn 14 positioned adjacent to anvil 12 in slightly spaced relationship thereto for sealing or splicing together parts of an article, such as, the edges or sheets of material or parts of a film cassette 13 placed on the anvil 12.

For movement towards and away from the anvil 12, the transducer T is mounted on a cylindrical shaft 16 which is movable up and down by a piston (not shown) operating within a cylinder 18 mounted on a frame indicated schematically at 20. Movement of the shaft 16 is accomplished by a pressure fluid, such as compressed air or liquid, supplied to and discharged from the cylinder 18 through conduits 22 and 24 controlled by solenoid-actuated two-way valves V1 and V2. Thus, when valve V2 is turned to admit pressure fluid into the lower end of cylinder 18, the piston is raised and the fluid above the piston is driven out of the cylinder 18 through conduit 22 and properly turned two-way valve V1. When valve V1 is turned to admit pressure fluid through conduit 22, the piston is driven down and the fluid below the piston is discharged through conduit 24 to waste, through properly turned two-way valve V2. The amount of pressure fluid added through conduit 22 is determined by the amount of sealing force desired. Mounted on the frame 20 is a position sensor 26 which may be of any form known to the art, such as, an electric eye or a mechanical contact which senses the position of the transducer T and transmits a signal to control system 11 just prior to the horn 14 contacting film cassette 13 positioned on the anvil 12. All of the aforementioned components, with the exception of the control system 11, are selectable from components well known to those skilled in the art.

Figure 2:
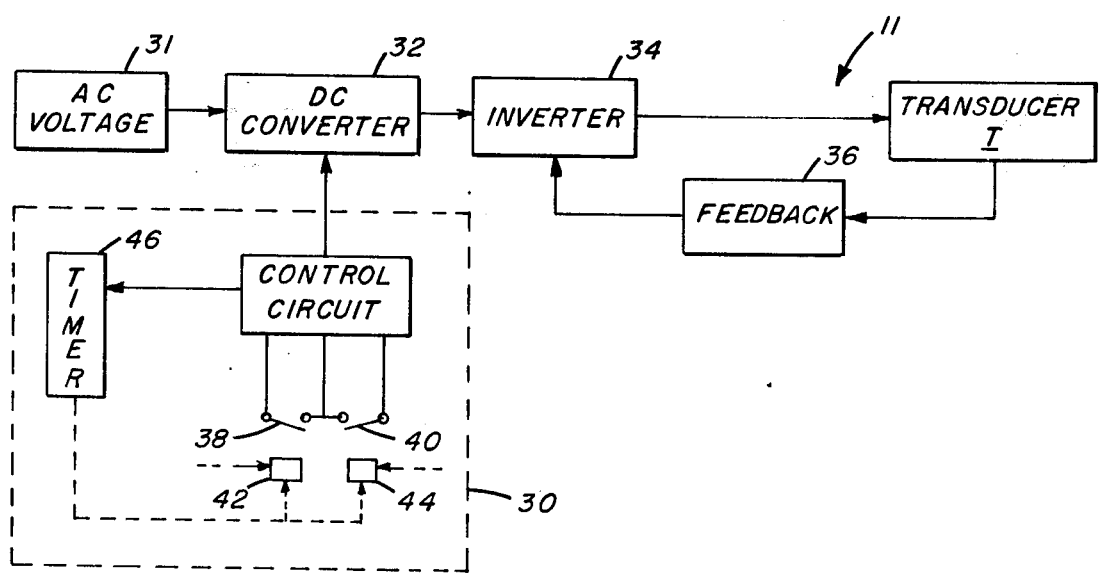
FIG. 2 is a schematic block diagram showing a control system for use with the sealing apparatus of FIG. 1.

Referring to FIG. 2, the components of the control system 11 may be seen.

Control system 11 is comprised of a control circuit, generally designated 30, an AC voltage source 31, a converter 32 for converting AC voltage into DC voltage, conventional ultrasonic inverter 34 for converting DC voltage from the converter 32 to AC voltage of a suitable ultrasonic frequency, such as about 20-40 KHz, for the transducer T, and a conventional feedback circuit, generally designated 36. The control system 11 also provides means (not shown) for controlling the operation of the solenoids associated with valves V1 and V2.

The control circuit 30 has two switches, 38 and 40 respectively, which control the level of power furnished the inverter 34 by the converter 32. Switch 38 is closed by a device 42 which is actuated either by sensing the initial movement of the transducer T towards the cassette 13, sensing the approach of the transducer T to the cassette 13, actuation of the solenoid controlled valve V1, or by other means well known to those skilled in the art.

Switch 40 is closed by a device 44 which is actuated either by a signal generated by sensor 26 as transducer T approaches cassette 13, a signal generated by the force build-up after horn 14 contacts cassette 13 (see U.S. Pat. No. 3,493,457 for description of a control circuit energized in response to the reaction of the engagement force between a horn and a workiece), or a signal generated by other means well known to those skilled in the art. Preferably, switch 40 is closed before full sealing force is applied thereby allowing development of full sealing power before the transducer T is fully loaded. This minimizes any tendency of the transducer T to stall under load.

Switch 38, upon closure, enables the converter 32 to furnish a first, relatively low level of voltage to the inverter 34. The first level, typically around 5–25 volts, is sufficiently low to prevent equipment damage under extended periods of operation, yet high enough to shock the horn 14 into vibration at or near the design frequency. Switch 40, upon closure, enables the converter 32 to furnish a second level of voltage, higher than the first level, to the inverter 34. Normally a timer or timing circuit 46 within the control circuit 30 opens switches 38 and 40 after a predetermined period of time; however, switch 38 could be opened by the closure of switch 40. When the switches 38 and 40 are opened, the flow of voltage from converter 32 to inverter 34 is stopped.

The feedback circuit 36 senses the amplitude and frequency of vibration of transducer T either directly or indirectly by means of transducer current. The Automatic Frequency Control (AFC) portion of the feedback is utilized to maintain oscillation at the natural mechanical resonant frequency of the transducer T assembly irrespective of load conditions which will vary from no load to full load. Specific circuits for accomplishing this are well known to those skilled in the art. The Automatic Power Control (APC) portion of the feedback circuit 36, if used, maintains constant vibrational amplitude of the transducer T when in the high power mode and under load. In the lower mode it is ineffective since the inverter 34 is operating in a starved current condition, being insufficiently powered to deliver more than a safe level of power to the unloaded transducer T, yet sufficient to establish the correct operating frequency and maintain vibration amplitude close to the normal operating level. It will be recognized that other circuit arrangements can be employed to achieve substantially the same result.

Figure 3:
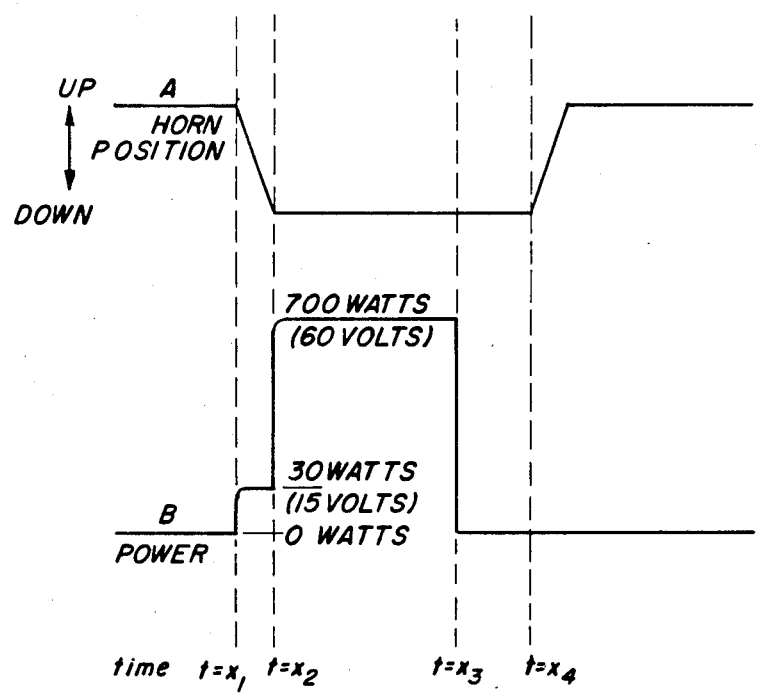
FIG. 3 graphically represents the interrelationship between the position of the transducer horn represented by line A, and the power to the inverter of the sealing apparatus of FIG. 1 represented by line B.

In operation, after cassette 13 or other material to be sealed or otherwise acted upon is in position on the anvil 12, an operator activates a switch which causes closures of switch 38 which furnishes a level power of between 25 and 100 watts (e.g., 30 watts at 15 volts) to the inverter 34 to initiate operation of the transducer T at the desired frequency (time $t = x_1$). Movement of the transducer T toward the anvil 12 is also started. Just before the horn 14 contacts cassette 13, position sensor 26 transmits a signal to close switch 40 which furnishes a high level of power to transducer T, e.g., 700 watts at 60 volts (time $t = x_2$). It should be noted that the relationships and values shown in FIG. 3 are for illustrative purposes and are not intended to limit the scope of the invention. In one embodiment (not shown), the signal from sensor 26 energizes an electrooptical sensor which shorts out a resistor in the control circuit 30 that disables the low level power and energizes the high level power (500–1000 watts). The transducer T is maintained in sealing relationship with the material on the anvil 12 for a predetermined period of time (from $t = x_2$ to $t = x_3$) dependent on the nature of the materials being sealed. The timer 46 at $t = x_3$ generates a signal to reduce or terminate power to the transducer T, preferably to zero. As shown in FIG. 3, clamping pressure is maintained for a period of time after the termination of power to the transducer T to allow the material being operated on to cool (between $t=x_3$ and $t=x_4$). The control system 11 at $t = x_4$ generates a signal to raise the horn 14 from the material.

As is well known in the art, the size and type of material being sealed and the desired speed of sealing determines the amount of input electrical power supplied the transducer T, the loading force or pressure applied to the transducer T and the operating frequency of the horn 14. In accordance with a specific non-limiting example, the low level power is approximately 30 watts, the high level power is approximately 700 watts and is maintained for about 500 milliseconds (ms) and clamping pressure is applied for approximately 200 ms after the power is turned off to allow the sealed material to cool.

The principles of the invention are applicable to many procedures for ultrasonically acting on a workpiece, such as web splicing, riveting, staking, plastic welding, and joining of such plastic parts as film cassettes. Also, the principles apply to many plastics such as polyethylene, plypropylene, poly(ethylene terephthalate), polymer and copolymers of vinyl chloride, cellulose esters, polystyrene, etc. The principles also apply to parts coated with such plastics or with heat activatable adhesives, for example, paper or metal foil so coated.

While movement of the transducer T toward and away from the workpiece has been described, it is to be understood that the transducer T can be held stationary and the workpiece moved toward and away from the transducer T.

The invention has been described in detail with particular reference to a preferred embodiment thereof, but it will be understood that variations and modifications can be effected within the spirit and scope of the invention.

We claim:

1. A method for operating on a workpiece with an ultrasonic transducer vibrating at a predetermined frequency, said transducer having a horn adapted to engage said workpiece, said method comprising the steps of:

energizing said transducer with a low level of power while out of contact with said workpiece, said low power level being sufficient to maintain vibration of said transducer at the predetermined frequency but insufficient to accomplish the operation on said workpiece;

effecting relative movement of said transducer and said workpiece toward one another while said transducer is energized with said predetermined low power level;

sensing the relative position of said transducer and said workpiece and generating a signal when said transducer is within a predetermined distance from said workpiece;

in response to said signal, increasing the power to said transducer to a level of power higher than said predetermined level, said higher power level being sufficient to accomplish the operation on said workpiece;

stopping said relative movement between said transducer and said workpiece with said horn engaging said workpiece; and maintaining said higher level of power with said horn engaging said workpiece for operating on said workpiece.

2. A method for acting on a workpiece with ultrasonic vibrations of a predetermined frequency, by applying to the workpiece a transducer vibrating at that frequency, said method comprising the steps of:

energizing said transducer with a predetermined low level of power while out of contact with said workpiece, said low level of power being sufficient to initiate and maintain vibration of said transducer at the predetermined frequency;

effecting relative movement of said transducer and said workpiece toward one another while said transducer is energized with said predetermined low power level;

sensing the application of said transducer to said workpiece and generating a signal indicative of said application;

in response to said signal, increasing the power to said transducer to a level substantially higher than said predetermined level;

acting on said workpiece with said transducer energized with power of said higher level;

reducing or stopping the supply of power; and effecting relative movement of said transducer and said workpiece away from one another.

3. Apparatus for acting on a workpiece with ultrasonic vibrations of a predetermined frequency, said apparatus comprising, in combination:

an ultrasonic transducer having a horn adapted to vibrate in engagement with the workpiece for acting on the workpiece;

mechanism for effecting relative movement of said transducer and the workpiece between a position in which said horn is disengaged from the workpiece and a position in which said horn engages the workpiece;

means for energizing said transducer with a predetermined low level of power while said transducer is in said disengaged position, said low level of power being sufficient to maintain vibration of said transducer at the predetermined frequency;

sensing means for sensing an intermediate position of said transducer between said disengaged and said engaged position, and for establishing a signal indicative of said intermediate position;

means responsive to said signal for increasing the power to said transducer to a level substantially higher than said predetermined level;

means for determining the passage of sufficient time for said transducer to act on the workpiece, and for terminating said higher power level after said time; and means for effecting relative movement between said transducer and the workpiece to said disengaged position after termination of said higher power level.

4. A method for improving the operation of an ultrasonic sealing apparatus, said apparatus comprising an anvil for holding material to be sealed, a transducer having a horn spaced from the anvil, an inverter for supplying power to the transducer, first means for effecting relative movement between the transducer and the anvil whereby the horn contacts the material and for applying a predetermined sealing force to the material and second means for extending relative movement between the transducer away from the anvil, thereby separating the horn from the material, said method comprising:

placing the material on the anvil;

actuating said first means to cause contact between the transducer and the material;

supplying low level power to the inverter at a predetermined period of time prior to the horn contacting the material thereby starting the horn vibrating;

switching the supply of power from low level to a high level at a predetermined time prior to the application of the predetermined sealing force, and continuing the higher power level for a predetermined period of time while the material and horn are in contact;

reducing or stopping the supply of power;

removing the sealing force a predetermined period of time after stopping the supply of power; and actuating said second means to separate the horn and the material.

5. In an ultrasonic sealing apparatus comprised of an anvil for holding material to be acted on, a transducer having a horn spaced from the anvil, an inverter for supplying power to the transducer, and means for moving the transducer towards and away from the anvil and for applying a sealing force that increases to a predetermined level, the improvement comprising:

means for providing the inverter with low level power simultaneously with the actuation of the means for moving the transducer towards the anvil;

sensing means, said sensing means sensing a predetermined position of the transducer or the increase in sealing force;

means responsive to said sensing means for supplying high level power to the inverter a predetermined period of time prior to said sealing force reaching said predetermined level, said means maintaining said high level power after said sealing force reaches said predetermined level for a period of time sufficient for the transducer to act on the material; and means for reducing or terminating the supply of low level and high level power prior to the removal of the sealing force.

6. In an ultrasonic sealing apparatus for acting on two or more sheets of material, said apparatus comprising an anvil for holding the material, a transducer having a horn spaced from the anvil, a power control system, an inverter responsive to the power control system for supplying power to the transducer, and means for moving the transducer towards and away from the anvil and for applying a sealing force that increases to a predetermined level, the improvement wherein said power control system comprises:

a power supply for furnishing low level and high level power to the inverter;

means for enabling said power supply to furnish said low level power prior to said horn contacting the material thereby causing said horn to being vibrating;

sensing means for generating a signal prior to said sealing force reaching said predetermined level;

means within said power supply responsive to said signal for switching from low level to high level power prior to said sealing force reaching said predetermined level and for maintaining said high level power after said sealing force reaches said predetermined level; and means for reducing or terminating the supply of power prior to the release of the sealing force.

7. A method for operating on a workpiece with a transducer ultrasonically vibrating at a desired frequency; said method comprising the sequential steps of:

energizing said transducer with a low level of power sufficient to shock said transducer into vibration at approximately the desired frequency but insufficient in power to accomplish the operation on the workpiece;

effecting relative movement between said transducer and the workpiece toward one another; and increasing the transducer power to a high level sufficient to accomplish the operation on the workpiece at the desired frequency;

said high level of power exceeding said low level of power by at least three times.

* * * * *